Aug. 8, 1961  C. G. HEDÉN  2,995,497
METHOD AND MEANS FOR TREATMENT OF A LIQUID
WITH A GASEOUS MEDIUM, OR VICE-VERSA
Filed Jan. 20, 1958
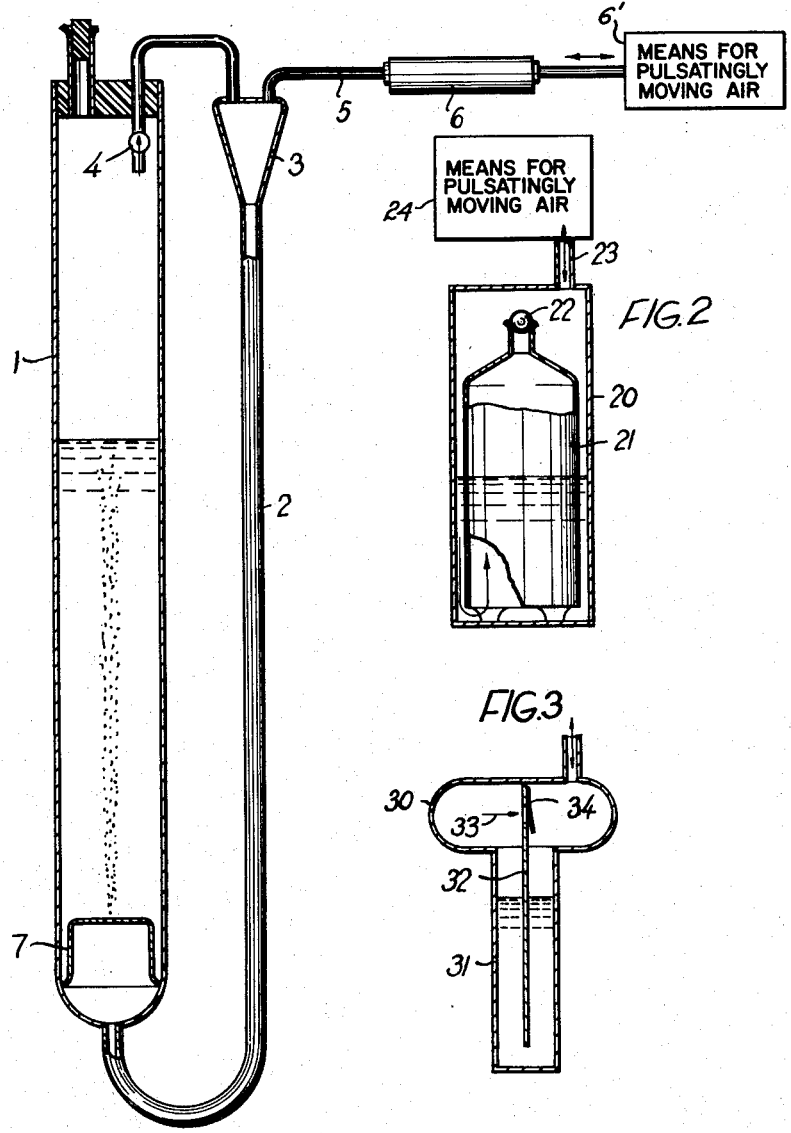
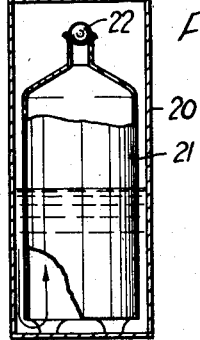
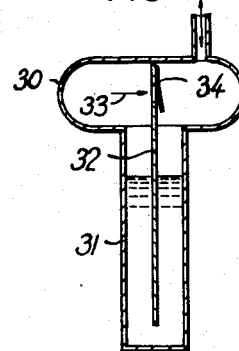
INVENTOR.
Carl Göran Hedén,
BY
Pierce, Scheffler & Parker
his attorneys United States Patent Office 2,995,497
Patented Aug. 8, 1961

2,995,497
METHOD AND MEANS FOR TREATMENT OF A LIQUID WITH A GASEOUS MEDIUM, OR VICE-VERSA
Carl Göran Hedén, Stockholm, Sweden, assignor to Biochemical Processes, Inc., New York, N.Y., a corporation of New York
Filed Jan. 20, 1958, Ser. No. 709,845
Claims priority, application Sweden Jan. 26, 1957
10 Claims—(Cl. 195—95)

Where cultivation of bacteria is brought into consideration, for example, it occurs that the bacteria when alluviated in a nutritive solution, are supplied with air, carbonicacid and so forth necessary for their growth by causing the gaseous medium to bubble up through the solution. Sometimes, disease-creating bacteria are topical in this respect, such bacteria having then to be prevented from entering the surrounding atmosphere, for which reason a filter must be provided in the venting conduit from the cultivating vessel. However, an intense formation of foam frequently occurs, so that the filter is apt to become moist and unserviceable. There is consequently a need for supplying the gaseous medium in a manner to prevent the foam from causing disturbances.

In other cases one might have to face the situation of supplying a gaseous medium, such as radio-active carbonic acid, to the nutritive solution, which acid must be utilized for economical reasons as far as possible and must consequently be recirculated through the liquid. To this end circulation must be maintained in a closed system which is separated from the surrounding atmosphere.

Corresponding needs may also present themselves in the chemical industry to provide for reaction between a gas and a liquid.

The present invention is concerned with the provision of a device for the treatment of a liquid with a gaseous medium or vice versa, and the device according to the invention is principally distinguished by the same consisting of a vessel for the liquid, to which vessel there is connected, at a level underneath the level of the liquid, a circulation conduit provided with a non-return valve and opening above the liquid, means being provided to vary the pressure in the conduit between the lower end thereof and the non-return valve, the latter permitting of a flow in a direction from the space above the liquid and into the conduit, so that gas is caused at the pressure variations to bubble intermittently through the liquid in pace with said variations.

The invention will be explained more closely in the following in connection with examples of embodiment thereof as illustrated in the accompanying drawing. Here, FIG. 1 shows diagrammatically a device for blowing air through a liquid, and FIG. 2 similarly shows a modified construction of such a device. Finally, FIG. 3 is a cross section through a device according to the invention as applied for photo-synthetic purposes.

In FIG. 1, 1 designates a vessel which is partly filled with liquid. Extending from the bottom of the vessel is a conduit 2 in which is comprised a container 3, and the conduit 2 opens into the upper portion of the vessel above the liquid, the mouth having arranged therein a non-return valve 4 formed as a ball valve.

Extending from the container 3 is a conduit 5, which is connected via a filter 6 to an intermittent blowing device herein shown diagrammatically at 6', by means of which for instance air may be supplied under pulsation at a suitable frequency, so that the pressure in the system varies.

The figure also indicates how at the bottom the vessel 1 there is provided above the mouth of the conduit 2 a cup 7 which is turned upside down, and the bottom of which is provided with a hole.

If it is assumed that the vessel 1 and the conduit 2 hold an atmospheric pressure from the beginning and that air is supplied through the conduit 5, this air will pass down through the conduit 2 and up into the cup 7 and out through the hole therein, so that air is finely divided and flows up through the liquid in the form of small bubbles. If the air supply is interrupted, the pressure in the system is equalized, and if the filter 6 is then connected with the free air, the pressure in the system will be lowered. During the passage of the air through the liquid, which may consist for instance of a nutritive solution with alluviated bacteria, a formation of foam may set in, so that the space above the liquid is filled with foam. At the balancing of the pressure this foam flows together with air out through the non-return valve 4 and is collected in the container 3. The foam is thus prevented from escaping through the conduit 5. When the pressure is then again raised by the supply of air, the foam in the container 3 will be pressed down through the conduit 2 and into the liquid. The filter 6 is thus kept entirely dry.

Instead of supplying air under pressure it is obviously possible intermittently to bring about a pressure below atmospheric in the system by connecting conduit 5 alternatingly to a vacuum source, e.g. a vacuum pump, and to the atmosphere, the procedure becoming then exactly as above described. Thus, the pressure variations may proceed at an arbitrary pressure level.

If the liquid is to be treated with a gas, which for economical reasons must be utilized to an extent as great as possible, the arrangement to bring about the varying pressure may be constituted by a bellows which is compressed and caused to expand, the gas being then caused to circulate through the liquid without escaping from the apparatus.

A further embodiment is shown in FIG. 2. Here, a downwardly open holder 21 is inserted into a vessel 20, said holder being provided with an opening controlled by a ball valve 22. The vessel is partly filled with liquid and provided with a connecting conduit 23, which is connected to a device, indicated diagrammatically at 24, for the variation of the pressure in the vessel.

If the pressure in the vessel 20 is increased, the liquid outside the holder 21 will be pressed into the same, and the gas will bubble up from the lower edge of the holder, until an equalization of the pressure has been reached. When this takes place depends on the weight of the ball 22. When the pressure is relieved in the vessel 20, the gas within the holder 21 will raise the ball 22, and any foam will likewise escape past the ball valve. With another increase of the pressure the procedure is repeated.

Where for instance algae are to be cultivated on a large extent, one endeavours to utilize the active rays of the sunlight, while the liquid, in which the algae are alluviated, is bubbled through with air at the same time. Here, the sunlight is to be caught over a large surface, and FIG. 3 shows a section through a vessel suited therefor.

The vessel is composed of two main parts, preferably an upper part 30 of a substantially oval section and a lower part 31, which is comparatively thin. The vessel is divided into two parts by means of a partition 32, said parts communicating with one another near the bottom of the vessel.

The vessel is relatively longish and made for instance from a plastic material of a type which is transparent to the active rays of the sunlight. The liquid containing the algae fills only a portion of the vessel part 31. Arranged in the partition 32 in the vessel part 30 are one or more non-return valves, 34, permitting a flow in the direction of the arrow 33 only.

If air is supplied to the right-hand part of the vessel 30 in the figure, the liquid in the vessel part 31 will be pressed up in the left shank thereof, and the air will then bubble up through the liquid. When the pressure is lowered in the right-hand part of the vessel, air and perhaps foam will pass through the non-return valves 34 in the partition 32 in the direction of the arrow 33. With another increase of the pressure the procedure is repeated.

The vessel 30, 31 may be made in great lengths in a serpentine fashion, and a plurality of lengths may be arranged over a large surface in such manner that they assume a suitable angle relative to the sunrays, so that the vessel part 31 is subjected to radiation in the best manner.

The invention is not limited to the embodiments described and shown but may be modified within the scope of the following claims.

What I claim is:

1. A method of treating a liquid with a gaseous medium which comprises establishing and maintaining a body of liquid beneath a body of gas within a confined space, admitting gas to the system from beneath the surface of the liquid, systematically varying the external pressure of the gas being admitted so that it alternately exceeds and is exceeded by the pressure of the confined gas and withdrawing gas directly from said gas space when the external pressure is exceeded by the pressure of the confined gas, whereby gas is alternately forced to bubble upwardly through the liquid and then withdrawn from the said gas space, and recycling at least a part of the withdrawn gas through the body of liquid.

2. Method defined in claim 1 in which the liquid is a medium for the cultivation of living cells.

3. Method defined in claim 1 wherein a component of the liquid and a component of the gaseous medium are chemically reactive with each other.

4. Method defined in claim 1 wherein the liquid tends to foam when gassed and wherein the foam is alternately withdrawn from the gas space in association with withdrawn gas and during the gas withdrawing step, and is at least in part recycled through the body of liquid in association with introduced gas and during the gas introducing step.

5. A device for the treatment of a liquid with a gaseous medium comprising a vessel for the liquid, a circulation conduit connecting the upper portion of said vessel with the lower portion thereof, a non-return valve in said circulation conduit permitting flow from said upper vessel portion to said lower vessel portion through said circulation conduit, and means for periodically varying the pressure in a portion of said circulation conduit between the lower end thereof and said non-return valve.

6. A device according to claim 5 and further comprising a branch conduit extending between said circulation conduit portion and said pressure varying means.

7. A device according to claim 5 in which a collecting container for any foam produced during the treatment forms part of the circulation conduit.

8. A device according to claim 7 in which the pressure varying means communicates with the upper end of said collecting container.

9. A device according to claim 5 in which the pressure varying means consists of means establishing a space of varying volume and forming together with the vessel and the circulation conduit a closed system for the gaseous medium.

10. A device for treating a liquid with a gas, comprising a vessel for the liquid, a gas circulation system comprising a collecting container, a first conduit communicating between the collecting container and the lower part of the vessel and a second conduit communicating between the collecting container and the upper part of the vessel, said second conduit comprising a non-return valve, and means including a third conduit opening into said collecting container for intermittently varying gas pressure within said collecting container.

References Cited in the file of this patent
UNITED STATES PATENTS

| | | |
|---|---|---|
| 1,608,251 | Shook et al. | Nov. 23, 1926 |
| 2,361,137 | Terry et al. | Oct. 24, 1944 |